United States Patent [19]
Takano et al.
[11] 3,711,640
[45] Jan. 16, 1973

[54] MAGNETIC TAPE HEAD TRACKING INDICATOR

[75] Inventors: Masayuki Takano, Tokyo; Yumihiko Suzuki, Kanagawa, both of Japan

[73] Assignee: Sony Corporation, Tokyo, Japan

[22] Filed: July 27, 1970

[21] Appl. No.: 58,218

[30] Foreign Application Priority Data

July 28, 1969 Japan ....................44/59484

[52] U.S. Cl........178/6.6 A, 178/DIG. 4, 179/100.2 B
[51] Int. Cl......G11b 27/36, G11b 21/10, H04n 5/78
[58] Field of Search............178/6.6 A, 7.92, DIG. 4; 179/100.2 B

[56] References Cited

UNITED STATES PATENTS

| | | | |
|---|---|---|---|
| 3,031,525 | 4/1962 | Oniki | 179/100.2 B |
| 3,435,136 | 3/1969 | Bachmann | 178/7.92 |
| 3,369,082 | 2/1968 | Hibbard | 179/100.2 B |
| 3,330,907 | 7/1967 | Arimura | 178/DIG. 4 |
| 3,502,804 | 3/1970 | Barr | 178/7.92 |

*Primary Examiner*—Howard W. Britton
*Attorney*—Lewis H. Eslinger, Alvin Sinderbrand and Curtis, Morris & Safford

[57] ABSTRACT

A magnetic tape recording and reproducing apparatus having a rotary magnetic head assembly for reproducing a recorded signal on a magnetic tape, and displaying the signal on a television screen, includes means for indicating the tracking condition of the head with respect to the recorded tracks on the tape. The indicating means includes a detector for detecting the value of the reproduced recorded signal, which signal varies in response to the tracking condition of the head, and an electronic circuit for generating a pulse signal in response to the detected value of the reproduced signal and mixing the pulse signal with the reproduced signal whereby an indication pattern is displayed on the television screen, which signal is representative of the value of the detected signal.

9 Claims, 10 Drawing Figures

INVENTORS
MASAYUKI TAKANO
YUMIHIKO SUZUKI

INVENTORS
MASAYUKI TAKANO
YUMIHIKO SUZUKI

INVENTORS
MASAYUKI TAKANO
YUMIHIKO SUZUKI

INVENTORS
MASAYUKI TAKANO
YUMIHIKO SUZUKI

MAGNETIC TAPE HEAD TRACKING INDICATOR

This invention relates generally to a magnetic tape recording and reproducing apparatus, and more particularly to a video tape recorder in which a video signal is recorded by a magnetic head assembly on a magnetic tape in the form of magnetic record tracks and reproduced by the head assembly from the magnetic record track to provide a video signal adapted to be displayed on the screen of a television receiver.

In magnetic recording and reproducing apparatus employing magnetic tape, inaccurate scanning of the recording tracks formed on the magnetic tape by the reproducing magnetic head during playback causes a decrease in value of the reproduced signal output from the magnetic head. This reduced signal output provides a reproduced video signal of lower S/N (signal-to-noise ratio) and hence provides a reproduced television picture of deteriorated quality. To avoid this problem tracking adjustment of the magnetic head has been proposed in the past to insure correct scanning of the head on the record track, based upon the indication of a meter provided for showing the tracking condition during playback. The meter indicates the value of the reproduced signal, however, it is difficult to read the meter and simultaneously observe the picture screen. Moreover, an optimum signal condition is difficult to determine from the meter. Further, meters of the previously proposed type are generally expensive.

Tracking adjustment can also be obtained merely by observing the quality of the video picture displayed on the television screen, but an accurate judgment of an optimum signal value is difficult to obtain particularly when deterioration of the S/N ratio is not substantial.

Accordingly, it is an object of the present invention to provide a magnetic video recording and reproducing apparatus which employs an improved magnetic head tracking and control system to obtain a high quality reproduced picture.

Another object of the invention is to provide a magnetic video recording and reproducing apparatus in which optimum magnetic head tracking condition may be manually established.

Yet another object of this invention is to provide a magnetic video recording and reproducing apparatus in which the magnetic head tracking condition may be indicated at will during playback by an image pattern produced on the screen of the television receiver.

It is a still further object of the present invention to provide a relatively inexpensive and simply constructed magnetic head tracking control system.

In accordance with an aspect of this invention, a magnetic tape recording and reproducing device having a rotary magnetic head assembly and a magnetic tape transporting means is provided with detector means for detecting the value of the signal reproduced from the magnetic tape by the recording and reproducing head. Typically, the signal on the tape is a frequency modulated signal and in that case the detecting means provided is an envelope detector which produces a signal whose value is representative of the value of the reproduced signal. The signal from the envelope detector is supplied to a multivibrator which is adapted to produce a pulse signal whose width varies in accordance with the value of the detected reproduced signal. The multivibrator is triggered by a pulse signal from a pulse generator in association with the rotary magnetic head, which signal has a repeating frequency corresponding to that of the vertical scanning signal. The signal produced by the width modulator is thence mixed with the reproduced signal and clips a portion of the video signal to produce a gray stripe pattern on the television screen. When the signal from the envelope detector is strongest, the width of the pulse from the width modulator will be widest and thus the width of the stripe pattern on the screen will also be the widest so that the optimum tracking condition, which produces the strongest detected reproduced signal can be determined by visually determining when the stripe pattern is widest.

The above, and other objects, features and advantages of this invention, will be apparent in the following detailed description of illustrative embodiments thereof which are to be read in conjunction with the accompanying drawings wherein.

Figure 1:
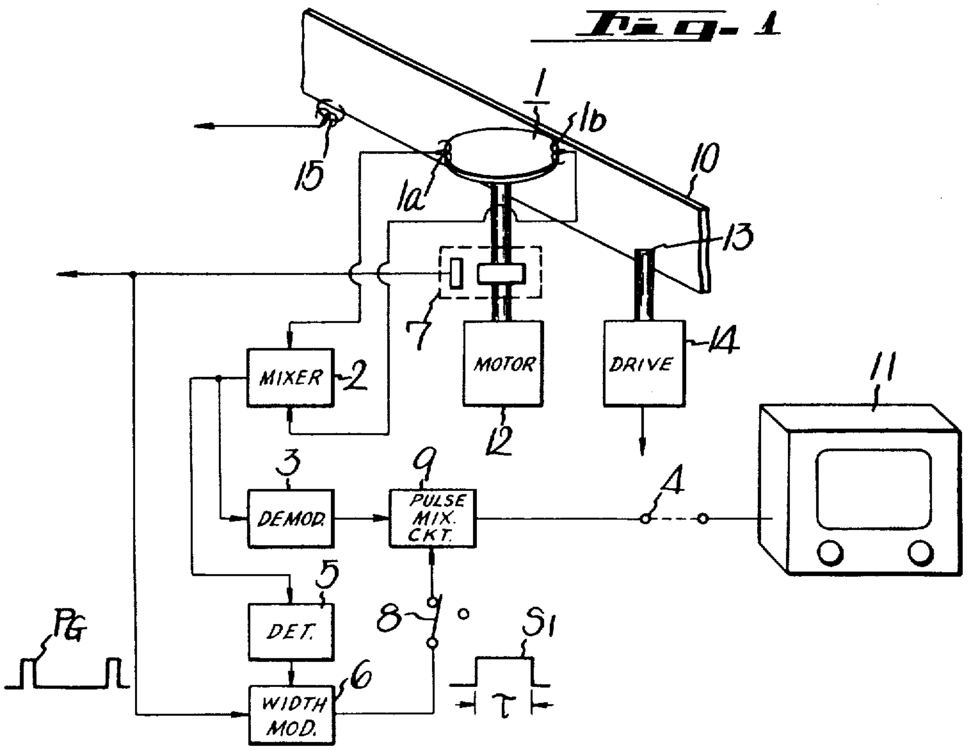
FIG. 1 is a block diagram of a magnetic head tracking control system according to an embodiment of the present invention.

Referring to the drawing in detail, and initially to FIG. 1 thereof, it will be seen that a tape recording and reproducing apparatus embodying the present invention, as shown therein, includes a rotary magnetic head assembly 1 having a pair of magnetic recording and reproducing heads 1*a* and 1*b* drivingly connected to motor 12 for rotation thereby during operation of the recording and reproducing apparatus. Typically, an FM video signal is recorded on magnetic tape 10 which is drawn past the rotating head assembly by a capstan 13. Magnetic recording and reproducing heads 1*a* and 1*b* pick up the recorded signal on tape 10 and supply the signal through their outputs to a mixer amplifier 2. As is conventional in video tape recording and reproducing apparatus, the amplified signal from mixer amplifier 2 is directed to a demodulator 3 which produces a demodulated video signal that is supplied to terminal 4 on television receiver 11 to display the signal as a visual image on the screen of the receiver.

As the magnetic head assembly 1 is rotated, the magnetic heads 1*a* and 1*b* should be properly aligned or tracked with the recorded tracks on tape 10. When the heads and tracks on the tape are misaligned or improperly tracked, the S/N ratio produced in the apparatus is substantially decreased and the quality of the picture displayed on the television screen is substantially reduced. When the heads 1*a* and 1*b* are properly tracking, the signal derived therefrom is at a maximum level, and this signal level is decreased when the heads are improperly aligned or improperly tracked.

Figure 2:
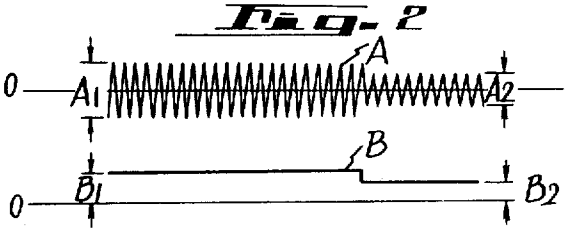
FIGS. 2 and 3 are signal wave form diagrams.

In the present invention, the levels of the signals picked up by magnetic heads 1*a* and 1*b* from tape 10 are detected, and utilized to obtain the optimum tracking condition of the heads with respect to the tape. When the video signal recorded on magnetic tape 10 is an FM signal, as for example, the signal A as shown in FIG. 2, the signal is detected by an envelope detector 5 to obtain an output which produces an output signal B whose value is determined by the amplitude of signal A. When magnetic heads 1*a* and 1*b* are properly tracked with magnetic tape, the output signal B produced by envelope detector 4 will be at its maximum level, whereas if heads 1*a* and 1*b* are misaligned or improperly tracked with tape 10, the signal level B will be substantially reduced. The signal thus produced by envelope detector 5 is supplied to a width modulator, as for example monostable multivibrator 6, which produces an output signal $S_1$ whose width $\tau$ is varied in accordance with the level of output signal B.

Figure 3:
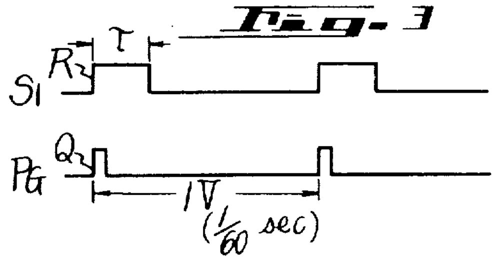

Pulse generator 7 is provided in association with rotary magnetic head assembly 1 to produce a pulse signal $P_G$ of, for example, 60 Hz, which is the repeating frequency of vertical scanner. Pulse signal $P_G$ is applied as a trigger signal to multivibrator 6. The leading edge of signal $P_G$ triggers the multivibrator and thus the leading edge of signal $S_1$ corresponds with that of pulse signal $P_G$ as shown in FIG. 3. Signal $S_1$, whose leading edge is determined by the signal $P_G$ and whose width is modulated by the signal received from envelope detector 5, is applied through switch 8 to a pulse mixing circuit 9 which is supplied with the signal demodulated by demodulator 3. Switch 8 is an on-off switch, which is moved to its on position when the tracking of the heads 1*a* and 1*b* is desired to be determined. Once proper tracking is established, as more fully described hereinafter, switch 8 is moved to its off position and signal A from demodulator 3 passes through mixing circuit 9 without interference directly to terminal 4 and receiver 11. It is noted that while the pulse signal $P_G$, in this embodiment is supplied from a pulse generator 7, the signal may also be produced by separating a vertical synchronization signal from the signal demodulated by demodulator 3.

Figure 4:
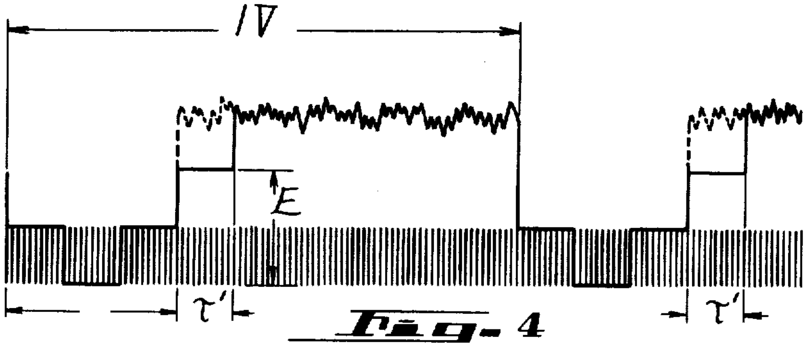
FIG. 4 is a diagram showing the wave form of a signal supplied to the television receiver by the system of the present invention.
Figure 5:
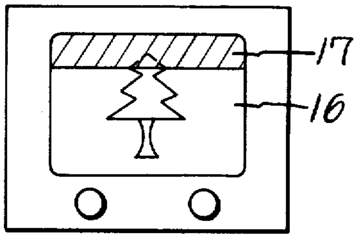
FIG. 5 is a front view of a television screen displaying a signal of the type shown in FIG. 4.

FIG. 4 diagrammatically illustrates the wave form of a television signal derived at the output of mixer 9 from the signals received from demodulator 3 and width modulator 6. As seen therein, the video signal is clipped at a level E by the output signal $S_1$, derived from width modulator 6 for a period $\tau'$, after a predetermined time, as for example, the vertical blanking period. This level is selected at an intermediate point between the black and white levels, as for example at a gray level, to produce a gray stripe image 17 on video screen 16, as seen in FIG. 5. The period $\tau'$ corresponds to the period $\tau$ of signal $S_1$ and thus, when the output of envelope detector 5 is maximum, i.e. when heads 1*a* and 1*b* are properly tracking, the period $\tau$ of the signal $S_1$ is a maximum and the period $\tau'$ is also a maximum. Accordingly, when such a signal as shown in FIG. 4, is supplied to screen 16 to the television receiver 11, a gray striped pattern 17 appears on the upper area thereof. When the period $\tau'$ is at a maximum the stripe pattern is widest and thus the tracking adjustment is at its desired optimum level or location.

The tracking adjustment is achieved by changing the relative contact position of the magnetic tape to the magnetic head, and is usually carried out by controlling the servo system of the rotary magnetic assembly 1 or by controlling the servo system of the capstan 13 for driving the tape.

Figure 6:
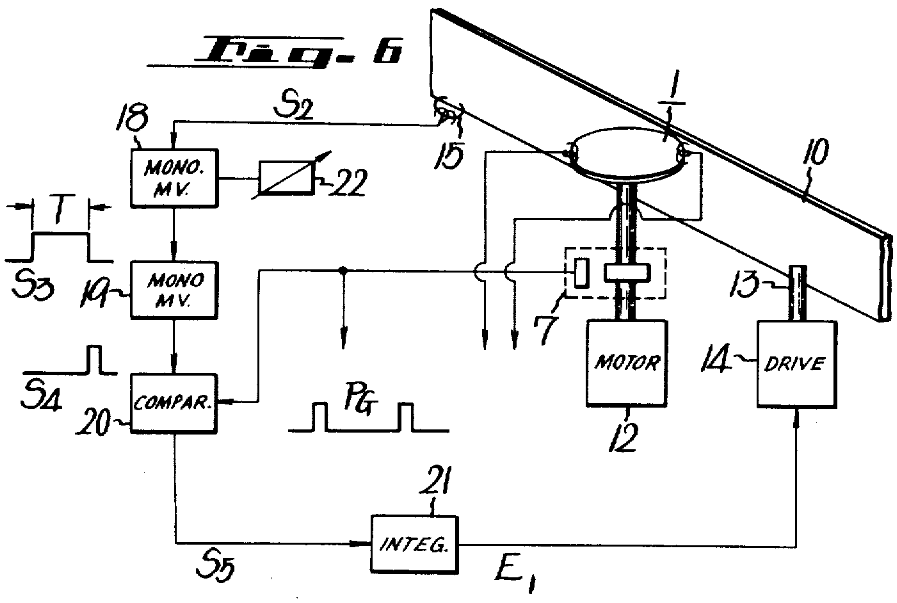
FIG. 6 is a servo system for use in conjunction with the present invention.

FIG. 6 illustrates a servo system for capstan 13 which is adapted to be used in the present invention to provide tracking adjustment. As seen therein a fixed magnetic head 15 is positioned adjacent magnetic head 1 for reproducing a pulse signal prerecorded on tape 10. Head 15 reproduces a control signal $S_2$ and supplies this signal to a monostable multivibrator 18, in which the width T of signal $S_2$ is variably adjusted to produce an output signal $S_3$. The width T is controlled by adjusting monostable multivibrator 18 by a controller 22 in a conventional manner. The resulting output signal $S_3$ is applied to monostable multivibrator 19 which is triggered by the trailing edge of the signal $S_3$ to produce a signal $S_4$ of a predetermined constant width. Pulse $P_G$ from pulse generator 7 is supplied with signal $S_4$ to a comparator circuit 20, to be compared in phase with signal $S_4$ and to produce an error signal $S_5$.

Error signal $S_5$ is applied to an integrator circuit 21 to produce a DC voltage $E_1$ by which driving means 14 for capstan 13 is controlled. Servo systems of the above described type are well known in the art and by adjusting monostable multivibrator 18 with controller 22, the phase of the rotary magnetic heads 1*a* and 1*b* with respect to tape 10 can be controlled, whereby the desired tracking adjustment is achieved. In this manner the phase of the rotary magnetic heads and the tracking of heads 1*a* and 1*b* with tape 10 is varied so that the widest form of stripe pattern 17 may be determined by observing screen 16 thereby to determine proper tracking or alignment of the magnetic heads 1*a* and 1*b* with the recorded tracks on tape 10.

Figures 7, 8:
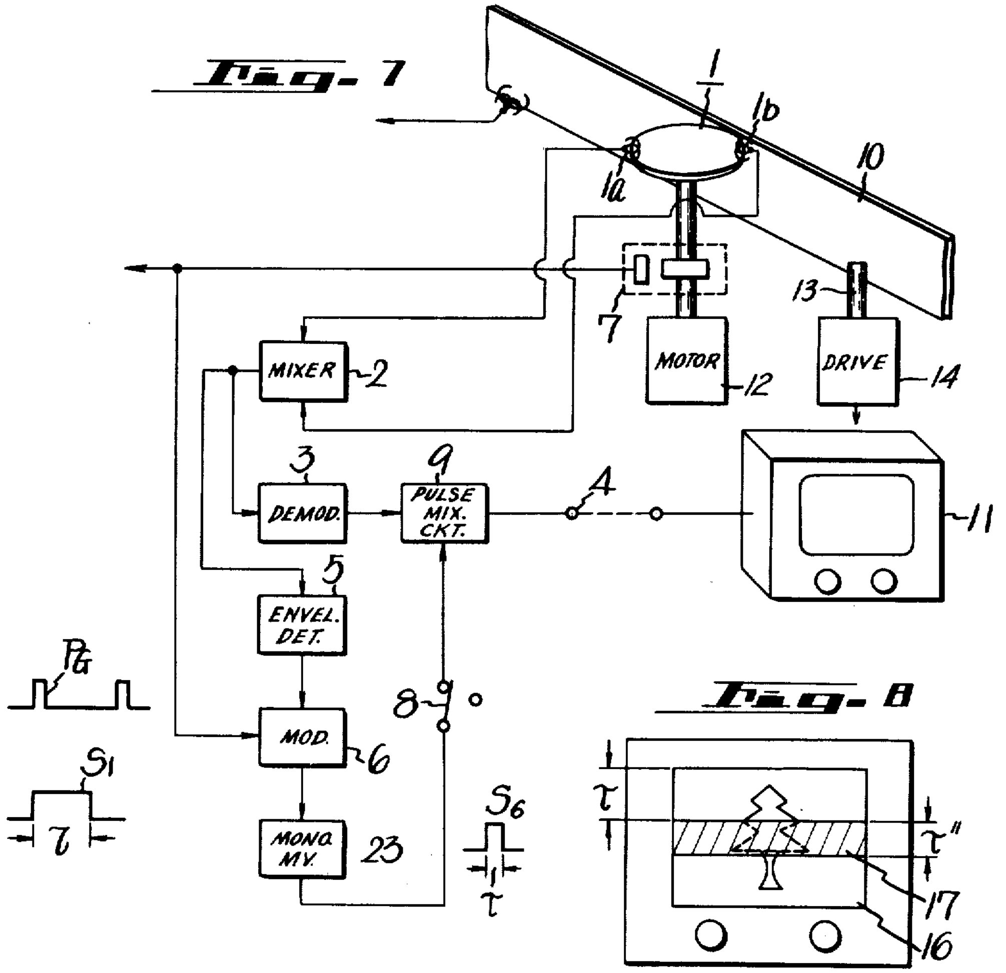
FIG. 7 is a block diagram, similar to FIG. 1, showing another embodiment of the magnetic head tracking control system of the present invention.
FIG. 8 is a front view of a television screen displaying a picture obtained by the circuit of FIG. 7.
Figure 9:
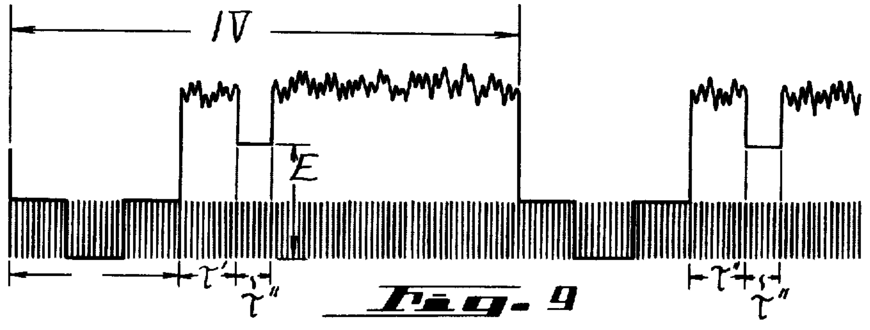
FIG. 9 is a diagram showing the wave form of a reproduced signal obtained by the circuit of FIG. 7.

FIG. 7 illustrates another embodiment of the present invention in which similar elements to those shown in FIG. 1 are identified by the same reference numerals. In this embodiment, a monostable multivibrator 23 is provided in series with width modulator 6 and receives the signal $S_1$ from modulator 6, which signal is produced in the same manner as previously described. The trailing edge of signal $S_1$ triggers multivibrator 23 to produce a signal $S_6$ having a width $\tau''$ which is constant at all times. Signal $S_6$ is then supplied to mixing circuit 9 to produce the gray stripe 17 on screen 16 as described above. However, in this embodiment the position of clipping, as seen in FIG. 9, is varied since the clipping signal $S_6$ is not supplied at the beginning of the vertical scanning, but rather at some period thereafter, depending on the width of signal $S_1$ and the time period $\tau$. Consequently, the width of stripe 17, which is based on the width $\tau''$ of signal $S_6$ is constant, and optimum tracking is determined by adjusting monostable multivibrator 18 shown in FIG. 6 in such a manner that the stripe pattern 17 will be displayed in the lowermost area of screen 16. When stripe pattern 17 is at its lowermost position, time period $\tau$ or width of signal $S_1$ is at a maximum, thus indicating that the signal detected by detector 5 is at its highest level. The resulting stripe pattern produced by signal $S_6$ is indicated in FIG. 8.

It is noted that switch 8, which is shown in the drawings as an independent element, may be operatively connected with monostable multivibrator 18, so that the switch is turned on only when this multivibrator is adjusted, thereby providing a one-step or one-operation tracking adjustment system which is automatically turned off when the multivibrator is properly adjusted.

In each of the above embodiments, the leading edge of output signal of $S_1$ of width modulator 6 is positioned relative to the vertical synchronizing signal or the pulse signal $P_G$ produced by pulse generator 7. However, it is noted that width modulator 6 may also be controlled by a horizontal synchronization signal utilized as a reference. In the latter case it is evident that the stripe pattern will appear in a vertical direction on television screen 16, however, the operation of the apparatus and the method of determining optimum tracking conditions would be substantially the same as in the previously described embodiments.

Figure 10:
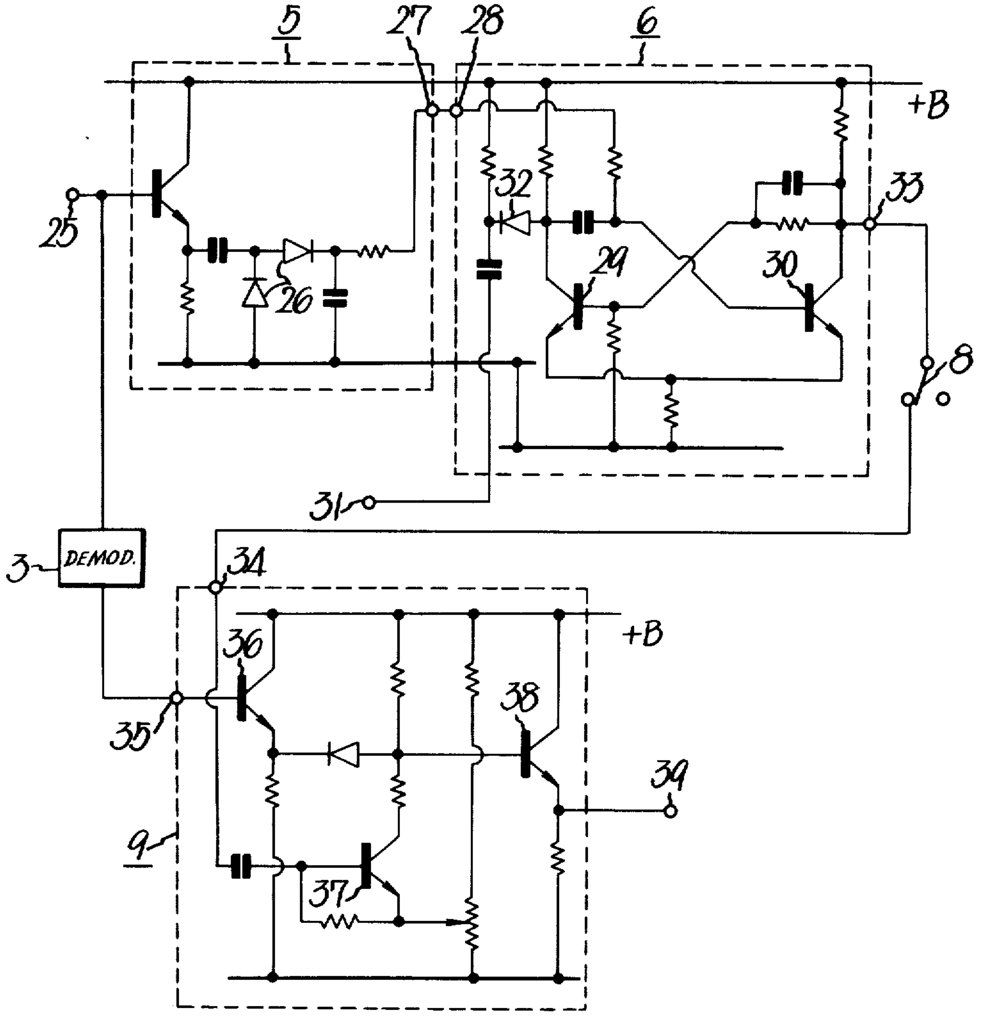
FIG. 10 is a circuit diagram of the principle component of the tracking control system illustrated in FIG. 1.

FIG. 10 is a detailed circuit diagram for envelope detector 5, monostable multivibrator 6, and mixing circuit 9, which elements make up the principle parts of the video forming circuit for tracking indication, which circuit is shown in block diagrams in FIG. 1. The output of mixer amplifier 2 is supplied to terminal 25 of envelope detector 5 and is envelope detected by the detector circuit, including diodes 26, which produces envelope detected output signal B at terminal 27; signal B is thence supplied through terminal 28 to the base of transistor 30 of monostable multivibrator 6 which includes additional transistor 29. Further, pulse signal $P_G$ is applied as a trigger signal to multivibrator 6 through terminal 31 to produce at terminal 33 a pulse signal having a width $\tau$ corresponding to the level of output signal B supplied to terminal 28. The pulse signal output is supplied through switch 8 to terminal 34 and transistor 37 of mixing circuit 9. The video signal demodulated by demodulator 3 is applied to a transistor 36 of mixing circuit 9 to be added with the pulse signal, thus providing through transistor 38, at output terminal 39, a mixed video signal as shown in FIG. 4.

It is noted that while the above embodiments of the present invention have been described in connection with a frequency modulated (FM) signal, it is contemplated that the invention is also applicable to a reproduction of an amplitude modulated (AM) signal. In the latter case, the signal on tape 10 reproduced by heads 1*a* and 1*b* is detected by a conventional average detector in lieu of an envelope detector.

While illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. Apparatus for use with a magnetic tape recording and reproducing device having a rotary magnetic head assembly for reproducing a recorded signal on magnetic tape and a magnetic tape transportation means, said apparatus being adapted to produce an image pattern on a television screen indicating head tracking condition on the recorded tracks of said magnetic tape and comprising: means connected to said rotary magnetic head for detecting the value of said reproduced signal; means to produce an additional signal in response to the detected value of said reproduced signal; and a mixing circuit connected to said means for detecting the value of said reproduced signal and to said means to produce an additional signal to add said additional signal to said reproduced signal.

2. Apparatus as in claim 1 wherein said additional signal producing means comprises means for generating a pulse signal whose width is varied in proportion to said detected value of said reproduced signal; and means for mixing said pulse signal with said reproduced signal.

3. Apparatus as in claim 2 comprising, in addition, means for producing an indicating pulse signal having an interval relating to a vertical scanning period and being adapted to control said pulse signal generating means.

4. Apparatus as in claim 2 wherein said signal generating means comprises a monostable multivibrator adapted to produce a signal whose width is varied in proportion to the output of said detecting means; and said apparatus further includes means for producing a pulse signal having a vertical scanning period for triggering said multivibrator.

5. Apparatus as in claim 2 wherein said means for producing an additional signal comprises another signal producing means for producing a pulse signal having a constant width, said last-named signal producing means being controlled by the output of said means for generating a pulse signal, said last-named signal producing means being connected to said mixing means to apply said constant width signal thereto.

6. Apparatus as in claim 5 wherein said last-named signal producing means comprises a monostable multivibrator.

7. A tape head tracking indicator for use in a magnetic tape recording and reproducing apparatus of the type adapted to produce a video signal for display on a television screen and having a rotary magnetic head assembly for reproducing a recorded signal on a moving magnetic tape, which signal varies in amplitude in response to the tracking condition of the head with respect to the recorded tracks on the tape, the indicator comprising: means connected to the rotary magnetic head for detecting the amplitude value of the reproduced recorded signal, means for generating a scanning signal pulse, and means responsive to both the detecting means and the scanning signal pulse for producing an indicator pulse signal having a leading edge synchronized to the scanning signal pulse and a width varied in proportion to the detected value of the reproduced recorded signal, and combining means responsive to the indicator pulse signal and the reproduced recorded signal for producing a display on the screen representative of an image corresponding in part to the video signal and in part to the value of the detected signal.

8. Apparatus as recited in claim 7 wherein the means for generating the scanning signal pulse is responsive to the rotary movement of the magnetic head and the indicator pulse signal generating means includes a monostable multivibrator triggered by the scanning signal pulse and adapted to produce a pulse signal whose width is varied in proportion to the output of the detecting means.

9. Apparatus as recited in claim 7 wherein the combining means further comprises means triggered by the trailing edge of the indicator signal pulse for producing a pulse signal having a substantially constant width, and means for mixing the pulse signal of substantially constant width with the reproduced recorded signal and for displaying the mixed signals on the screen such that in addition to a portion of the image representative of the reproduced recorded video signal there also appears on the screen a stripe of substantially constant width and in a location representative of the amplitude of the output of the detecting means.

* * * * *